(12) United States Patent
Kumagai et al.

(10) Patent No.: US 8,412,418 B2
(45) Date of Patent: Apr. 2, 2013

(54) INDUSTRIAL MACHINE

(75) Inventors: Kaoru Kumagai, Itabashi-ku (JP);
Atsushi Tanahashi, Livermore, CA (US); Hitoshi Otani, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 461 days.

(21) Appl. No.: 12/387,971

(22) Filed: May 11, 2009

(65) Prior Publication Data

US 2010/0121540 A1 May 13, 2010

(30) Foreign Application Priority Data

Nov. 12, 2008 (JP) .................................. 2008-290388

(51) Int. Cl.
*G06F 19/00* (2011.01)
(52) U.S. Cl. .......................................... 701/50; 382/154
(58) Field of Classification Search .................... 701/50, 701/200, 207, 213; 348/113, 116, 118–120; 382/154, 103, 104; 37/348, 382, 413–416
See application file for complete search history.

(56) References Cited

U.S. PATENT DOCUMENTS

| 5,961,573 | A | * | 10/1999 | Hale et al. | 701/214 |
| 6,581,695 | B2 | * | 6/2003 | Bernhardt et al. | 172/439 |
| 7,317,977 | B2 |  | 1/2008 | Matrosov | 701/50 |
| 7,605,692 | B2 | * | 10/2009 | Yamada et al. | 340/438 |
| 7,669,354 | B2 | * | 3/2010 | Aebischer et al. | 37/348 |
| 7,865,285 | B2 | * | 1/2011 | Price et al. | 701/50 |
| 2005/0197756 | A1 | * | 9/2005 | Taylor et al. | 701/50 |
| 2011/0169949 | A1 | * | 7/2011 | McCain et al. | 348/137 |

FOREIGN PATENT DOCUMENTS

| JP | 2001-146761 | 5/2001 |
| JP | 2004-294067 | 10/2004 |
| JP | 2005-337741 | 12/2005 |

* cited by examiner

*Primary Examiner* — Alicia Torres
(74) *Attorney, Agent, or Firm* — Nields, Lemack & Frame, LLC

(57) ABSTRACT

An industrial machine comprises an industrial machine main unit, a construction working implement installed on the industrial machine main unit, two cameras each mounted at a known position with respect to a machine center of the industrial machine main unit, at least three targets being installed on the working implement so that the targets are within visual field of each of the two cameras, and an arithmetic processing device. The arithmetic processing device is used for extracting the images of at least three targets in common to the images from stereo-images taken by the two cameras, for obtaining a three-dimensional position of each target image, and for calculating a position and a posture of the working implement with respect to the industrial machine main unit based on the three-dimensional position obtained.

15 Claims, 6 Drawing Sheets

PRIOR ART

INDUSTRIAL MACHINE

BACKGROUND OF THE INVENTION

The present invention is an industrial machine that can detect a position and a posture of a working implement of the industrial machine with respect to the industrial machine main unit. For instance, the present invention relates to a construction machine such as bulldozer, power shovel, etc. In particular, the invention relates to a construction machine, in which it is possible to detect the position and the posture of the construction working implement such as soil-pushing blade, bucket, etc. with respect to a construction machine main unit.

In civil engineering operation, e.g. in ground-leveling operation by using bulldozer, it is indispensable to accurately identify the position and the posture (such as tilting) of a ground-leveling implement (bulldozer blade) with respect to a ground surface to be leveled for the purpose of accomplishing the ground-leveling operation with high accuracy. Also, it is essential to accurately detect the position and the posture (such as tilting) of the ground-leveling implement for the purpose of carrying out the ground-leveling operation as initially planned without depending on a sense of an operator of the construction machine.

In the past, a construction machine for detecting height and position of the ground-leveling implement has been known and disclosed in JP-A-2005-337741.

FIG. 6 of JP-A-2005-337741 shows a rotary laser irradiation unit 1 for projecting a laser beam 5 in rotary irradiation and for forming a reference plane. FIG. 6 also shows a pole 3 erected on a ground-leveling implement 2, and a photodetecting unit 4 mounted on the pole 3. It has been practiced in the past to detect the laser beam 5 by the photodetecting unit 4, to detect the reference plane, and to detect a position in a vertical direction of the ground-leveling implement 2 based on a position of the reference plane detected by the photodetecting unit 4.

According to JP-A-2005-337741, it is possible to detect a position of the ground-leveling implement 2 with respect to the reference plane, i.e. the ground surface to be leveled, while it is not possible to detect the position and the posture of the ground-leveling implement 2 with respect to a construction machine main unit 6. On the other hand, when an operator operates the ground-leveling implement 2, the operator must adjust position and posture (such as tilting) of the ground-leveling implement 2 with reference to the construction machine main unit 6. In this case, adjusting operation based on an obtained result of detection may not necessarily be consistent with the sense of the operator and may cause an erroneous operation.

Further, U.S. Pat. No. 7,317,977 B2 discloses a bulldozer 7 as a construction machine. A pole 9 is erected on a blade 8 of the bulldozer 7, a first GPS antenna 11 is installed at an upper end of the pole 9, and a second GPS antenna 12 and a third GPS antenna 13 are installed in front and back on the bulldozer 7 itself.

According to the U.S. Pat. No. 7,317,977 B2, as shown in FIG. 7, an absolute position in upward direction of the blade 8 can be detected by the first GPS antenna 11, and a position and a direction of the bulldozer 7 can be detected by the second GPS antenna 12 and the third GPS antenna 13. Based on a result of the position detection by the first GPS antenna, and based on the result of the position detection by the second GPS antenna 12, and the third GPS antenna 13, a relative position of the blade 8 with respect to the bulldozer 7 can be determined by a calculation.

However, a position detecting system including the GPS antenna is expensive in cost. Further, three sets of the systems are needed for determining the relative position of the blade, accordingly, the system is so expensive.

When the blade 8 is tilted in a front-to-back direction, the pole 9 is also tilted. As a result, a deviation occurs between a horizontal position and a vertical position detected by the first GPS antenna 11 and an actual position of the blade 8. Also, in case where the blade 8 is rotated in horizontal direction around the pole 9 as a center, there is no change in a result of the detection by the first GPS antenna 11, and a rotating position in horizontal direction of the blade 8 cannot be detected.

Further, in some cases, the tilting of the blade 8 with respect to the bulldozer 7 is detected by using a tilt sensor. In such case, a responsiveness of the tilt sensor is not be very accurate, and a reaction to vibration may occur. As a result, the tilt sensor is not very suitable for the detection of tilting of the blade 8 when the blade 8 is moving.

SUMMARY OF THE INVENTION

It is an object of the present invention to provide a posture detecting system, which is simple in construction and can detect a position and a posture (including tilting and the like) of a working implement with respect to the industrial machine main unit at real time and with high accuracy, and also, to provide an industrial machine equipped with this type of posture detecting system.

To attain the above object, the present invention provides an industrial machine, comprising an industrial machine main unit, a construction working implement installed on the industrial machine main unit, two cameras each mounted at a known position with respect to a machine center of the industrial machine main unit, at least three targets being installed on the working implement so that each of the targets are within visual field of the two cameras, and an arithmetic processing device for extracting the images of at least three targets in common to the images from stereo-images taken by the two cameras, for obtaining a three-dimensional position of each target image, and for calculating a position and a posture of the working implement with respect to the industrial machine main unit based on the three-dimensional position obtained.

Also, the present invention provides the industrial machine as described above, wherein the cameras are video-cameras, and wherein the arithmetic processing system is so designed as to calculate a position and a posture of targets of each frame image. Further, the present invention provides the industrial machine as described above, wherein each of the targets is a plate or a plate-like object where a reflecting portion in circular shape and a non-reflecting portion around the reflecting portion are formed. Also, the present invention provides the industrial machine as described above, wherein a target image formed by the reflecting portion of each of the targets occupies at least 5 pixels of a photodetector of each camera, and the arithmetic processing device calculates a center of the target image by a moment method. Further, the present invention provides the industrial machine as described above, further comprising a GPS device being installed on the industrial machine main unit and used for obtaining a position coordinate of the industrial machine main unit, wherein the arithmetic processing device calculates a position coordinate of the working implement based on the position coordinate measured by the GPS device. Also, the present invention provides the industrial machine as described above, wherein the GPS device has a target being disposed within visual field of each of the two cameras, and wherein the arithmetic processing device calculates a position coordinate of the working implement based on the position coordinate measured by the GPS device.

The present invention provides an industrial machine, comprising an industrial machine main unit, a construction working implement installed on the industrial machine main unit, two cameras each mounted at a known position with respect to a machine center of the industrial machine main unit, at least three targets being installed on the working implement so that each of the targets are within visual field of the two cameras, and an arithmetic processing device for extracting the images of at least three targets in common to the images from stereo-images taken by the two cameras, for obtaining a three-dimensional position of each target image, and for calculating a position and a posture of the working implement with respect to the industrial machine main unit based on the three-dimensional position obtained. As a result, without using an expensive complex device it is possible to detect the position and the posture of the working implement with respect to the industrial machine main unit in easy manner and at real time without considering a noise or a delay in response of the machine.

Also, the present invention provides the industrial machine as described above, wherein the cameras are video-cameras, and wherein the arithmetic processing system is so designed as to calculate a position and a posture of targets of each frame image. As a result, it is possible to detect the position and the posture of the working implement during operation in easy manner and at real time.

Further, the present invention provides the industrial machine as described above, wherein each of the targets is a plate or a plate-like object where a reflecting portion in circular shape and a non-reflecting portion around the reflecting portion are formed. As a result, the target image can be easily extracted from the image without performing a complicated procedure of image processing. Also, because the reflecting portion is in circular shape, a position of a center can be accurately detected even when the target is tilted with respect to the optical axis of the camera.

Also, the present invention provides the industrial machine as described above, wherein a target image formed by the reflecting portion of each of the targets occupies at least 5 pixels of a photodetector of each camera, and wherein the arithmetic processing device calculates a center of the target image by a moment method. As a result, an accuracy to detect the center position of the target can be improved.

Further, the present invention provides the industrial machine as described above, further comprising a GPS device being installed on the industrial machine main unit and used for obtaining a position coordinate of the industrial machine main unit, wherein the arithmetic processing system calculates a position coordinate of the working implement based on the position coordinate measured by the GPS device. Also, the present invention provides the industrial machine as described above, wherein the GPS device has a target being disposed within visual field of each of the two cameras, and wherein the arithmetic processing system calculates a position coordinate of the working implement based on the position coordinate measured by the GPS device. Thus, a position information can be controlled and a construction operation can be carried out based on the position of the working implement.

DETAILED DESCRIPTION OF THE PREFERRED EMBODIMENT

A description will be given below on the best mode for carrying out the present invention by referring to the attached drawings.

First, referring to FIG. 1, a description will be given on an example of a construction machine, in which the present invention is carried out.

Figure 1:
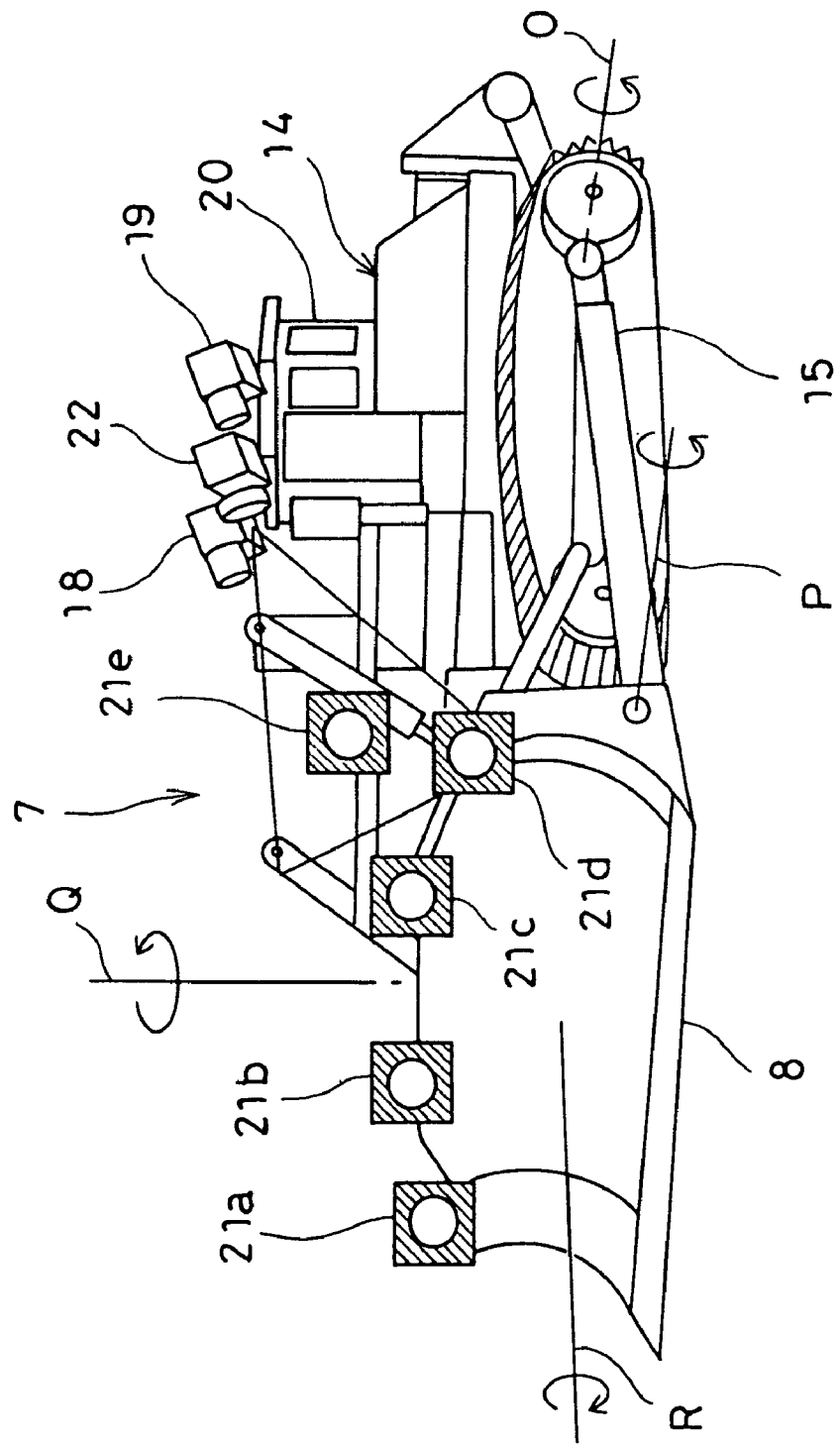
FIG. 1 is a perspective view to show a case where the present invention is applied on a bulldozer.

In FIG. 1, a bulldozer 7 is shown as a construction machine, and the bulldozer 7 is provided with a bulldozer blade 8 mounted on its front surface as a construction working implement. The blade 8 is disposed at a forward end of an arm 15, which is attached on a bulldozer main unit 14. The blade 8 is so designed that the blade 8 can be rotated in directions along four axes with respect to the bulldozer 7 so that the blade 8 can have various types of postures to match a multi-functional purposes.

The arm 15 is mounted on the bulldozer main unit 14 so that the arm 15 can be tilted around an O-axis which runs in horizontal direction with respect to the bulldozer main unit 14. The blade 8 is mounted on the arm 15 so that the blade 8 can be rotated with respect to the arm 15 around a horizontal P-axis, around a vertical Q-axis, and around an R-axis, which runs horizontal in front-to-back direction of the bulldozer main unit 14.

Although the details are not shown in the figure in particular, a hydraulic cylinder (not shown) for driving purpose is disposed to match each of the axes. The arm 15 can be tilted and moved, and the blade 8 can be independently rotated around the P-axis, the Q-axis and the R-axis respectively.

A reference position is set up with respect to the blade 8. As the reference position of the blade 8, a reference position (0°) is set for each of O-axis, P-axis, Q-axis, and R-axis. As the reference position, angles on each of O-axis, P-axis, Q-axis, and R-axis are 0° respectively, for example, in a condition that a lower edge of the blade 8 is at a horizontal position, that the lower edge of the blade 8 concurs in height with a moving surface of the bulldozer main unit 14, that the lower edge of the blade 8 runs in a direction perpendicular to the moving direction of the bulldozer main unit 14, and that a lower surface of the blade 8 is at a horizontal position.

Figure 2:
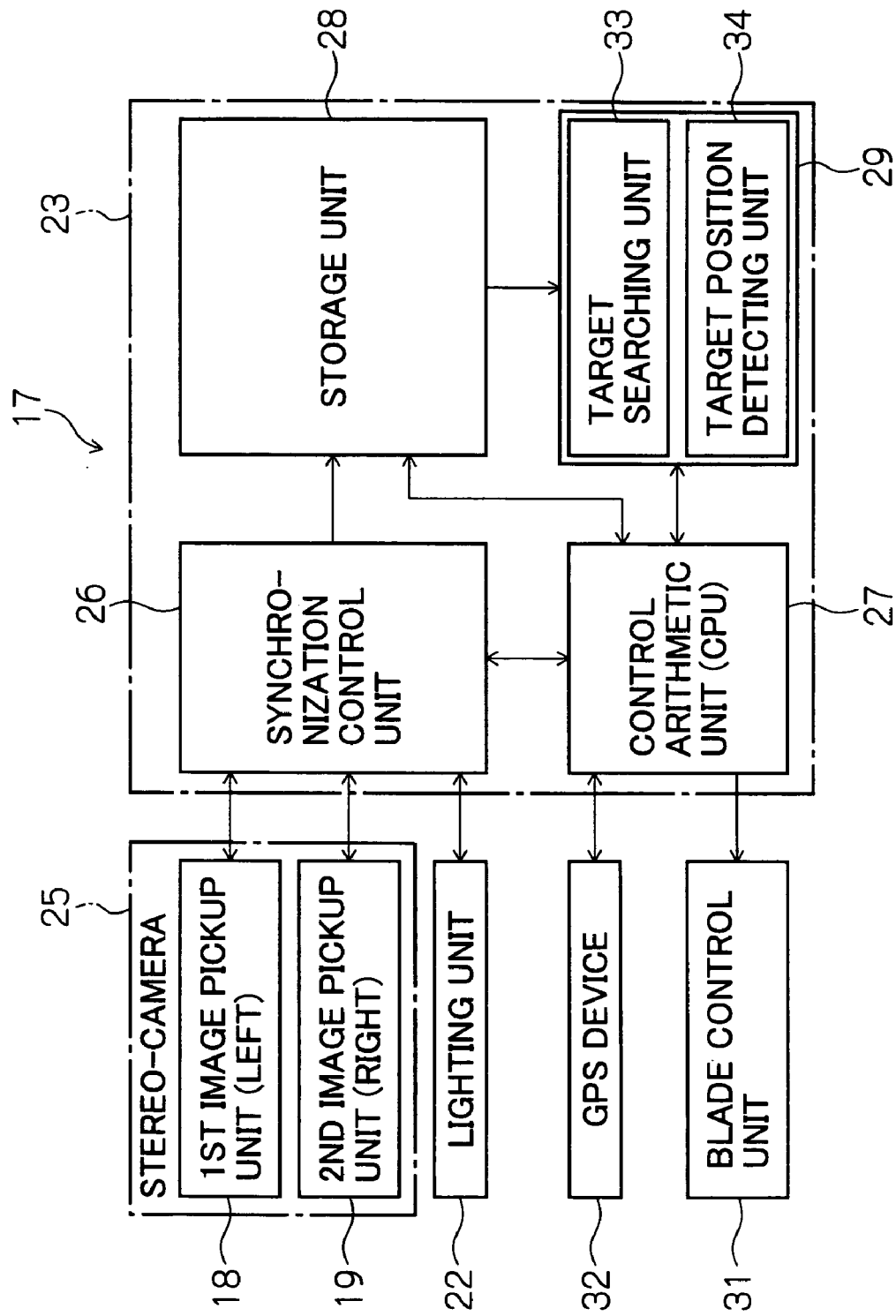
FIG. 2 is a block diagram to show an approximate arrangement of a posture detecting system according to the present invention.

A posture detecting system 17 according to the present invention primarily comprises two cameras 18 and 19 (i.e. a first image-pickup unit and a second image-pickup unit) provided on required positions, e.g. a front portion of a roof of a driver's cabin 20, blade-detecting targets 21a, 21b, 21c, 21d and 21e disposed at the positions as required and furnished as many as required, e.g. at 5 positions so that each target will be in visual field of each of the cameras 18 and 19, and a lighting unit 22, and an arithmetic processing device 23 as shown in FIG. 2.

The blade 8 is easily soiled and stained with mud, water and dust. Similarly, the blade-detecting targets 21 attached on the blade 8 are also easily soiled and stained. Therefore, the targets may not be recognized by the cameras 18 and 19. In this respect, it is so arranged that as many blade-detecting targets as possible are attached on the blade 8.

Each of the blade-detecting targets 21*a*, 21*b*, 21*c*, 21*d*, and 21*e* is designed to have a predetermined external shape, e.g. each target is designed as a plate or a plate-like object in square or in circular shape. In each of the blade-detecting targets 21, a high-reflecting portion in circular shape in a predetermined size is formed at the center of a low-reflecting portion. It is so designed that a difference between the reflectivity of the low-reflecting portion and the reflectivity of the high-reflecting portion has a predetermined value or higher. For instance, a reflecting paint is coated at the center with a background in black color. As to be described later, at least three of the blade-detecting targets 21*a*, 21*b*, 21*c*, 21*d*, and 21*e* may be provided. However, assuming a case where some of the blade-detecting targets 21 may be within dead angle or a case where reflecting light cannot be obtained because a mud or the like is attached on the target, four or more blade-detecting targets 21 are disposed.

In determining the installing position of each of the blade-detecting targets 21*a*, 21*b*, 21*c*, 21*d*, and 21*e*, by specifying the installing positions with respect to the blade 8, from mechanical relation between the blade 8 and the center position of the bulldozer main unit 14 (hereinafter referred as "machine center") (not shown), the relation between the blade-detecting targets 21*a*, 21*b*, 21*c*, 21*d*, and 21*e* and the machine center can be identified (such as a distance, a horizontal angle, a vertical angle, etc.).

Also, for the cameras 18 and 19, positional relation between the machine center and each of the cameras 18 and 19 can be identified from mechanical relation between the roof and the machine center if the installing positions of each of the cameras with respect to the roof of the driver's cabin 20 can be confirmed. Further, a positional relation between the blade-detecting targets 21*a*, 21*b*, 21*c*, 21*d*, and 21*e* and each of cameras 18 and 19 can be identified via the machine center.

That is, under the condition that the blade 8 is set at the reference position (e.g. under the condition where rotation angle with respect to O-axis, P-axis, Q-axis and R-axis is 0° respectively), a distance between each of the cameras 18 and 19 and each of the blade-detecting targets 21*a*, 21*b*, 21*c*, 21*d*, and 21*e* can be identified, and further, a vertical angle and a horizontal angle, etc. of each of the blade-detecting targets 21*a*, 21*b*, 21*c*, 21*d*, and 21*e* with respect to a collimation center line of each of the cameras 18 and 19 can be identified. The positional relation thus obtained is set and inputted to a storage unit (to be described later).

At the reference position of the blade 8, a direction to mount each of the blade-detecting targets 21*a*, 21*b*, 21*c*, 21*d*, and 21*e* is set in such manner that each of the targets is at the equivalent angle with respect to each of the cameras 18 and 19. For instance, it is so arranged that a perpendicular line passing through a center of one blade-detecting target 21 will be a bisector of an angle, which is formed by a straight line connecting a center of the target with the camera 18 and a straight line connecting the center of the target with the camera 19.

Also, on the relation between the camera 18 and the camera 19, a distance between the camera 18 and the camera 19 and an angle formed by two optical axes of the camera 18 and the camera 19 are determined from a mechanical positional relation and is specified in advance.

Further, as to be described later, for the purpose of executing the matching of the images acquired by the cameras 18 and 19, a calibration is performed on the cameras 18 and 19 based on the positional relation between the camera 18 and the camera 19.

A digital camera is used as each of the cameras 18 and 19, and a photodetector of each of the cameras 18 and 19 is, for instance, CCD, or CMOS, etc., which is an aggregate of pixels. At the photodetector, a position of the pixel detected can be identified, and a field angle can be determined from the position of the pixel.

A video camera is used as each of the cameras 18 and 19, or a type of camera is used so that still pictures can be taken at a rate of 10 pictures or more per second, or preferably, at a rate of about 20 pictures per second.

A GPS antenna (not shown) is installed at a position as required on the bulldozer main unit 14, e.g. on the roof of the driver's cabin 20, and a GPS signal processing unit (not shown) for measuring a position on a ground surface (an absolute coordinate position) based on a signal from the GPS antenna is installed at a position as required of the driver's cabin 20. The GPS antenna and the GPS signal processing unit make up together a GPS device 32 (to be described later).

Now, referring to FIG. 2, a description will be given on the posture detecting system 17.

The cameras 18 and 19 make up together a stereo-camera 25. Image data taken by the camera are inputted to a control arithmetic unit 27 and to a storage unit 28 via a synchronization control unit 26. An image processing unit 29 is connected to the control arithmetic unit 27 and to the storage unit 28. The arithmetic processing device 23 comprises the synchronization control unit 26, the control arithmetic unit 27, the storage unit 28, and the image processing unit 29.

The control arithmetic unit 27 detects the position and the posture of the blade 8 based on results of image processing by the image processing unit 29. Based on the result of the detection, an instruction signal for carrying out a position control and a posture control of the blade 8 are issued to a blade control unit 31. Based on the instruction signal, the blade control unit 31 drives hydraulic cylinders (not shown).

A signal from the GPS device 32 is inputted to the control arithmetic unit 27, and the control arithmetic unit 27 calculates a position of the bulldozer main unit 14 based on the signal.

By the GPS device 32, the position (an absolute coordinate position) of the bulldozer main unit 14 is measured. Because a position of the GPS antenna with respect to the machine center of the bulldozer main unit 14 and the position of the blade 8 are already known, the absolute coordinate position of the blade 8 can be also measured.

Because the coordinate position of the machine center of the bulldozer main unit 14 can be determined from a result of the measurement by the GPS device 32, the position of the blade 8 can be determined in the same coordinate system as the position coordinate of the bulldozer main unit 14 based on the positional relation with the bulldozer main unit 14 as obtained from the image processing of the blade-detecting targets 21*a*, 21*b*, 21*c*, 21*d*, and 21*e*. Accordingly, it is possible to determine the position of the blade 8 of the bulldozer 7 in the coordinates on global geodetic coordinate system.

The image processing unit 29 has a target searching unit 33, a target position detecting unit 34, etc. The target position detecting unit 34 detects a blade-detecting target 21 from an image of each frame on the image data of each camera acquired by the cameras 18 and 19 and performs a tracking processing of the blade-detecting target 21 between each frame. The target position detecting unit 34 detects the blade-detecting target 21, performs matching of the blade detecting target 21 between an image taken by the camera 18 and an image taken by the camera 19, and detects a center position of the blade-detecting target 21 as detected.

A reference position data of each of the blade-detecting targets 21a, 21b, 21c, 21d, and 21e with respect to the machine center of the bulldozer main unit 14, and further, the data such as position data of each of the cameras 18 and 19 with respect to the machine center are stored in the storage unit 28. Also, various types of programs are stored in the storage unit 28. These programs include, for instance: a blade position-posture calculating program for calculating the posture of the blade 8 obtained from a height and a tilting of the blade 8 with respect to the bulldozer main unit 14 based on a positional information of the blade detecting target 21, and a posture control program for controlling the position and the posture of the blade 8 based on the position and the posture of the blade 8 thus calculated, or the like.

According to the present invention, the position of each of the blade-detecting targets 21a, 21b, 21c, 21d, and 21e is measured from two images acquired by the cameras 18 and 19, and a relative height, a relative tilting and the posture of the blade 8 with respect to the bulldozer main unit 14 are determined by calculation based on the positional information of the blade-detecting target 21 thus obtained.

Figure 3:
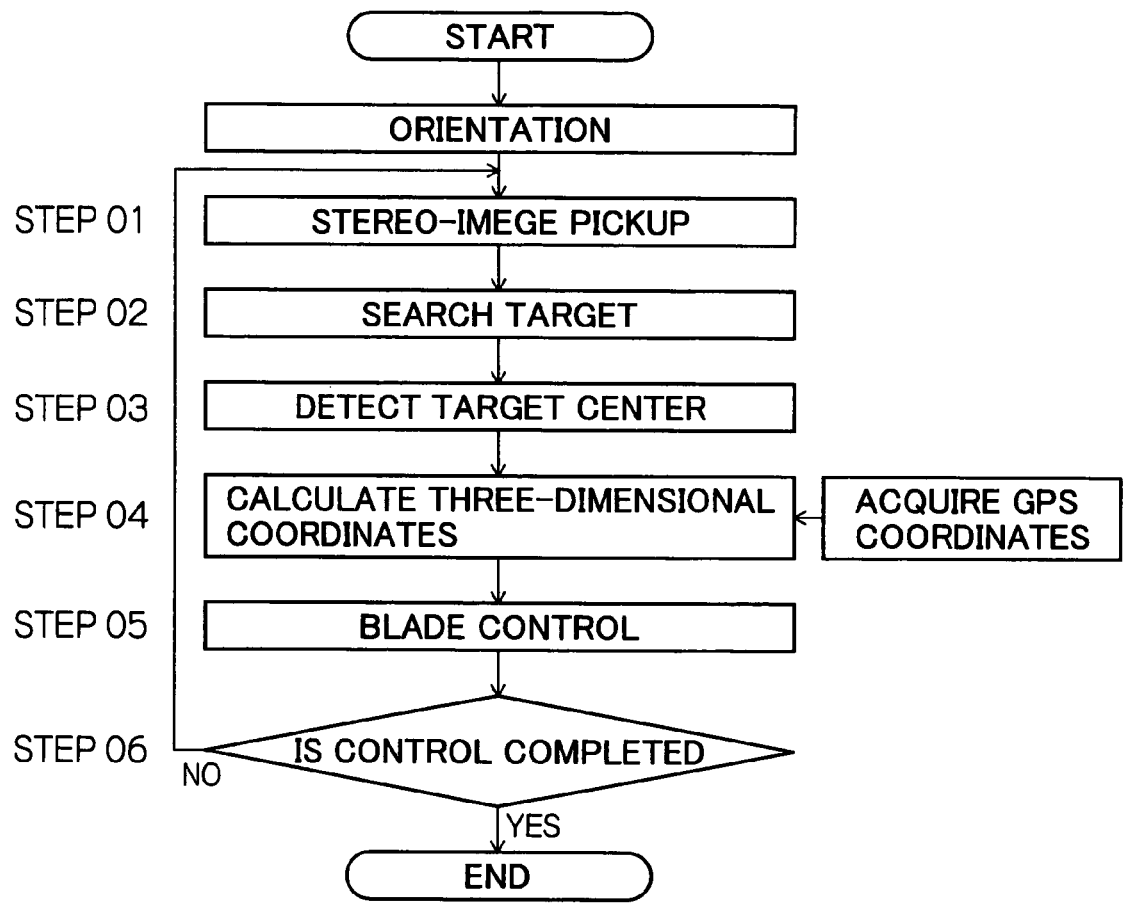
FIG. 3 is a flowchart to explain an operation of a position detection and a posture detection according to the present invention.

Referring to FIG. 3, a description will be given below on operation according to the present invention.

Before carrying out the operation, an orientation operation is performed. The orientation operation is an operation to associate the two cameras with the position of the target. By using a pair of images taken by two cameras, orientation is performed by target images interrelated in the two images.

(Step 01) The lighting unit 22 is turned on, and a light is projected to each of the blade-detecting targets 21a, 21b, 21c, 21d, and 21e. When sufficient reflection light can be obtained from the blade-detecting targets 21a, 21b, 21c, 21d, and 21e in daytime, there is no need to turn the lighting unit 22 on.

The blade 8 is set at the reference position, and images of the blade 8 are taken by the cameras 18 and 19 respectively. In each image thus taken, the blade-detecting targets 21a, 21b, 21c, 21d, and 21e are included. The images thus obtained are stored in the storage unit 28 as digital image data.

(Step 02) For the images stored in the storage unit 28, a target image is extracted from the images at the image processing unit 29. The extraction of the target image is performed by a template matching of the stored image with a template-acquired image of the target image obtained in advance. Or, when a reflection light from the blade-detecting target 21 is more conspicuous than the background as in a case at nighttime or the like, the image data is turned to be a binary value, and the blade-detecting target 21 is extracted. Because the blade-detecting targets 21a, 21b, 21c, 21d, and 21e are disposed on the blade 8, the blade-detecting targets 21 themselves fulfill the functions as characteristic points, and there is no need to extract the characteristic points by image processing. Because a prominent reflection light can be obtained from each of the blade-detecting targets 21, a burden on the image processing by the image processing unit 29 is reduced. Even in an image of lower image quality, the extraction can be easily performed on the blade-detecting targets 21.

The position and the posture of the blade 8 are controlled by the blade control unit 31 via the hydraulic cylinders. Therefore, the position and the posture of the blade 8 with respect to the cameras 18 and 19 or with respect to the machine center can be predicted based on the controlling condition of the blade control unit 31. For instance, based on a control signal obtained from the blade control unit 31, the arithmetic processing system 23 estimates the position and the posture of the blade 8, and from the images obtained by the cameras 18 and 19, the arithmetic processing system 23 estimates a line on the blade where the blade-detecting targets 21. By performing the image processing to detect the blade-detecting targets 21 along the estimated line, the process of the detection of the targets can be speeded up. Or, by predicting the position of the blade-detecting targets 21 based on the prediction of the position and the posture of the blade 8, and by detecting the blade-detecting targets 21 based on the predicted positions, the detecting speed of the targets enable to be increased.

As a method for the template matching, the following methods are known: an SSDA method (sequential similarity detection algorithm: A residual of density values between template and matching window is obtained, and a position is determined where the residual becomes at the minimum), or a normalized cross correlation method (Cross correction: a correlation value between the template with the matching window is calculated, and the matching point is searched), or a Least square matching method (Least squares matching: the shape of the matching window is set as an unknown parameter by using affine transformation, and a position and a shape of the matching window with respect to the template is determined).

An association of the images of each of the blade-detecting targets 21a, 21b, 21c, 21d, and 21e in the images taken and the blade-detecting targets 21a, 21b, 21c, 21d, and 21e disposed on the blade 8 can be executed based on a mutual position of the blade-detecting targets 21a, 21b, 21c, 21d, and 21e on the images and also based on the known a positional relation between the reference position of the blade 8 and the cameras 18 and 19.

The positional relation is compared between the target images in both the images obtained by the camera 18 and the camera 19. Then, it is judged whether there is something in common between these target images or not. Further, target images, which are at positions in common, are selected at predetermined number at least three, for instance, the blade-detecting targets 21a, 21b, and 21c.

(Step 03) On the selected target images, the center of each image is determined by a calculation. Because the target, i.e. the reflecting portion, is in circular shape as described above, each of the blade-detecting targets 21 is tilted with respect to the optical axis of each of the cameras 18 and 19. Even when the image acquired is in elliptical shape, the center of the image can be detected accurately.

As an example to detect the center of the target from the image, a moment method is adopted.

According to the moment method, a target image is turned to be a binary value (0,1). On the coordinates thus set up, each moment of the coordinates to indicate 1 is determined, and a center coordinate of the target is obtained based on a sum of moments.

Specifically, if it is supposed that an area including the target image is S, and that a small image obtained by the processing to turn to be a binary value including the target is expressed by the following equation:

$$f(i,j) = \{0 (i,j) \notin \text{(not belonging to)} \ S; \ 1 (i,j) \in \text{(belonging to)} \ S\},$$

the moment of the area S can be defined as follows:

$$M_{pq} = \Sigma i^p j^q f(i,j)$$

In this case, the center coordinates (x,y) of the target can be calculated according to the following equations:

$$x = M10/M00$$

$$y = M01/M00$$

In case the center coordinates are obtained according to the moment method as described above, it is so arranged that there are preferably as many as 10 or at least 5 or more signals to indicate 1. That is, a size of the blade-detecting target 21 and a distance between the blade-detecting target 21 and each of the cameras 18 and 19 are set so that there are at least 5 or more pixels of photodetection element, which issues a signal to indicate 1.

By calculating the center coordinates on as many pixels as predetermined according to the moment method, a position accuracy can be improved. For instance, when the center coordinates are calculated on 10 pixels, the accuracy is increased by 10 times compared with the case where a coordinate position is calculated on one pixel.

(Step 04) By two images (stereo-image) taken by the cameras 18 and 19, three-dimensional coordinates of each of the blade-detecting targets 21a, 21b and 21c are calculated.

Figure 4:
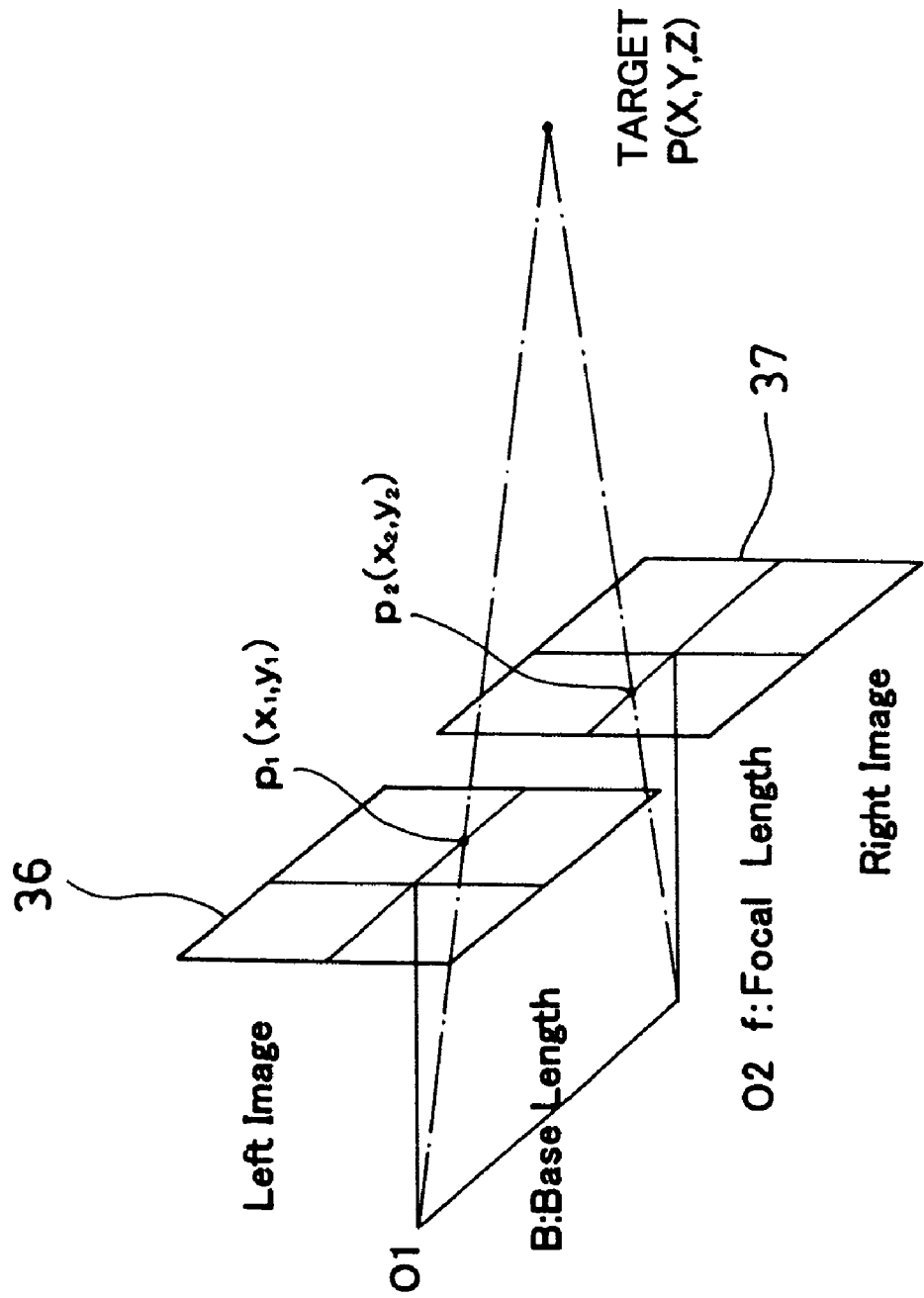
FIG. 4 is an explanatory drawing to show a position measurement by using a stereo image.

As shown in FIG. 4, it is supposed here that three-dimensional coordinates of the blade-detecting target 21 is represented by P(X,Y,Z), a photodetecting surface of the camera 18 is represented by a reference numeral 36, a photodetecting surface of the camera 19 is represented by a reference numeral 37, a focal position of the camera 18 is represented by a reference symbol O1, a focal position of the camera 19 is represented by a reference symbol O2, a focal distance of each of the cameras 18 and 19 is represented by a reference symbol "f", a distance between the focal position O1 and the focal position O2 is represented by a reference symbol B, and target center positions of each of the photodetecting surfaces 36 and 37 are represented by p1 and p2 respectively. Then, three-dimensional coordinates P(X,Y,Z) can be calculated by the following equations:

$$X = x1 \times B/(x1-x2)$$

$$Y = y1 \times B/(x1-x2)$$

$$Z = -f \times B/(x1-x2)$$

where
B: Base length of stereo-camera
f: Focal distance of camera
Image coordinates of the target:
Left coordinates: p1 (x1,y1)
Right coordinates: P2 (x2,y2)

(Step 05) The control arithmetic unit 27 calculates a relative position and the posture of the blade 8 with respect to the bulldozer main unit 14 based on the three-dimensional coordinates obtained on each of the blade-detecting targets 21a, 21b and 21c. Then, a control signal is issued to the blade control unit 31 based on a result of calculation, and the position and the posture of the blade 8 are controlled via the blade control unit 31.

(Step 06) In case where the position and the posture of the blade 8 are continuously controlled, the blade-detecting targets 21a, 21b, 21c, 21d and 21e are extracted for each image obtained over time by the camera 18, and tracking is performed between the images. Similarly, on the images obtained over time by the camera 19, extraction and tracking of each target image are carried out.

Further, three-dimensional coordinates are calculated on the extracted target image. In case the cameras 18 and 19 are video-cameras, images of the blade-detecting targets 21 are continuously kept taking, and the continuous images of the blade-detecting targets 21 are acquired. Then, image processing is performed at real time on the moving pictures thus acquired. Because the images are taken continuously, a deviation between a preceding image data and a subsequent image data is trivial, and the same blade-detecting targets 21 can be easily associated between the preceding image data and the subsequent image data. Therefore, each of the blade-detecting targets 21 can be sequentially identified on the continuous image (without using an identification data by a recognition such as ID)—that is, each of the blade detecting target 21 can be tracked. (If the images disappear) if a consistency is lost between the preceding image and the image of the blade-detecting target 21, the tracking by using the image data should be suspended. And, from the images of the blade-detecting targets 21, distinctly consistent images should be used sequentially, and the tracking should be continued. It would suffice if at least three target images are acquired.

Three-dimensional coordinates are calculated on each of the images of each frame. Therefore, if the images acquired within one second are in 30 frames, three-dimensional coordinates are calculated on the images of 30 frames. As a result, the three-dimensional position and the posture of the blade 8 can be obtained at real time. Based on the position and the posture thus obtained, the procedures of Step 01 to Step 05 are repeated, and a position control of the blade 8 can be carried out at real time.

In the embodiment as described above, a description has been given on a case where the present invention is applied to a bulldozer, while the cases are included where the present invention is applied to other construction machine, for instance, to a motor grader or to a power shovel paver. In case where the present invention is applied to the power shovel, a position and a posture of a bucket are detected, and in case where the present invention is applied to the paver, a position and a posture of a screed are detected.

In the description as given above, the moment method has been described as a method to detect the center of the target in Step 03, while the detection can be executed by another method. A description will be given below on the another method.

The lighting unit 22 is turned on, or it is turned on and off to flash, and the light is projected toward the blade-detecting targets 21 so that the blade-detecting targets 21 give strong flash light. When the image processing unit 29 extracts the blade-detecting targets 21 from the image, the image processing unit 29 uses the blade-detecting target 21 in order of brightness of the reflection lights. Each of the blade-detecting targets 21 is made to flash strongly. Thereby the central portion of the image is detected with high accuracy through the processing to have binary values of the target images. A size of the central portion (high reflecting portion) of the blade-detecting target 21 is already known. A size (diameter) of the circular image (target image) as detected by the binary processing is identified. If the identified size (diameter) is larger than a predetermined deviation with respect to the known value, the blade-detecting target 21 should be excluded. Because a distance H between the stereo-camera 25 and the blade-detecting target 21 is already known through the orientation as performed in advance, a size of the circular shape of the blade-detecting target 21, i.e. ($\Delta XY$), can be calculated as:

$$\Delta XY = H \times \Delta P/f$$

where
$\Delta P$: Size of pixel
f: Focal distance
FIG. 5 shows an applied example of the present invention.

The GPS device 32 is installed on the bulldozer main unit 14. A blade-detecting target 21g is installed on the bulldozer main unit 14 so that the target is located at a predetermined position with respect to an antenna of the GPS device 32. Or, the GPS device 32 and the blade-detecting target 21g are integrated with each other, and it is assumed that a measuring position of the GPS device and a position of the blade-detecting target 21g are approximately the same. In case where the blade detecting target 21g and the GPS device 32 are installed separately from each other, a positional relation of each other should be determined in advance.

Figure 5:
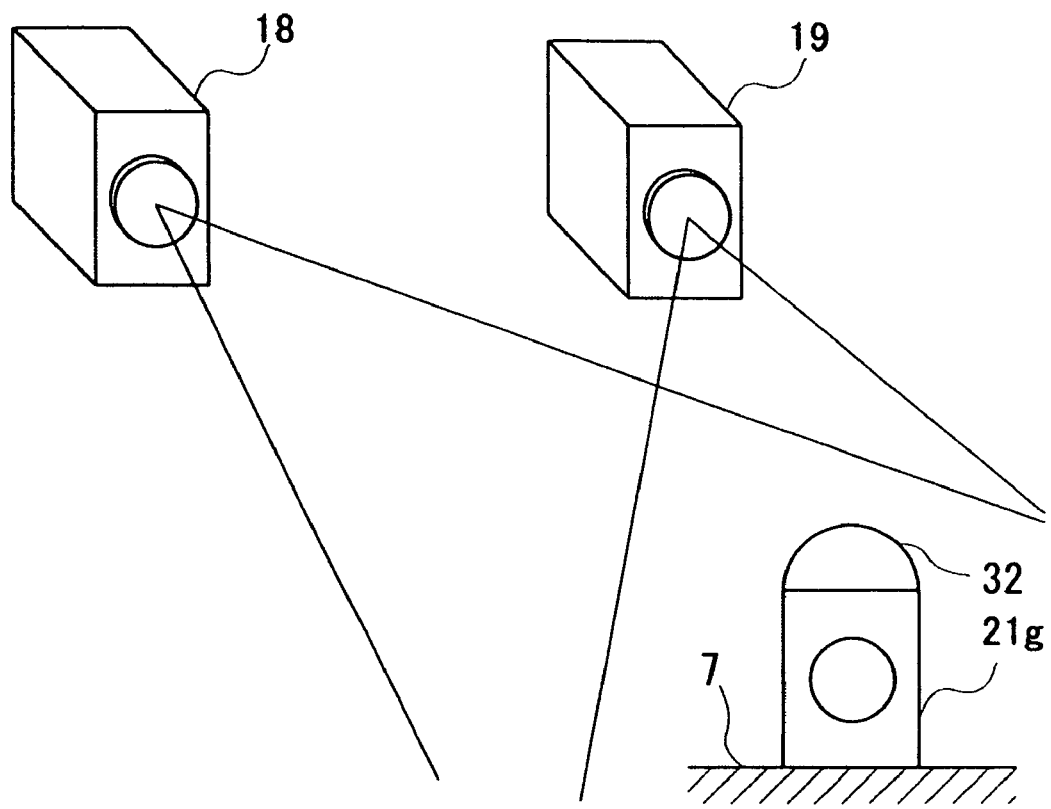
FIG. 5 is an explanatory drawing to explain an application example of the present invention.
Figure 6:
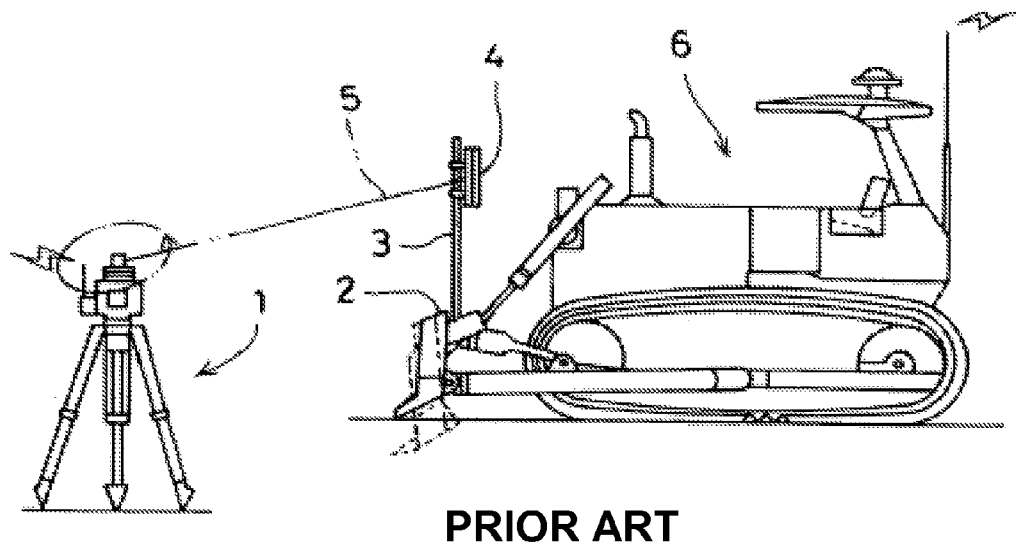
FIG. 6 is an explanatory drawing to explain a position detection by a conventional type ground-leveling implement.
Figure 7:
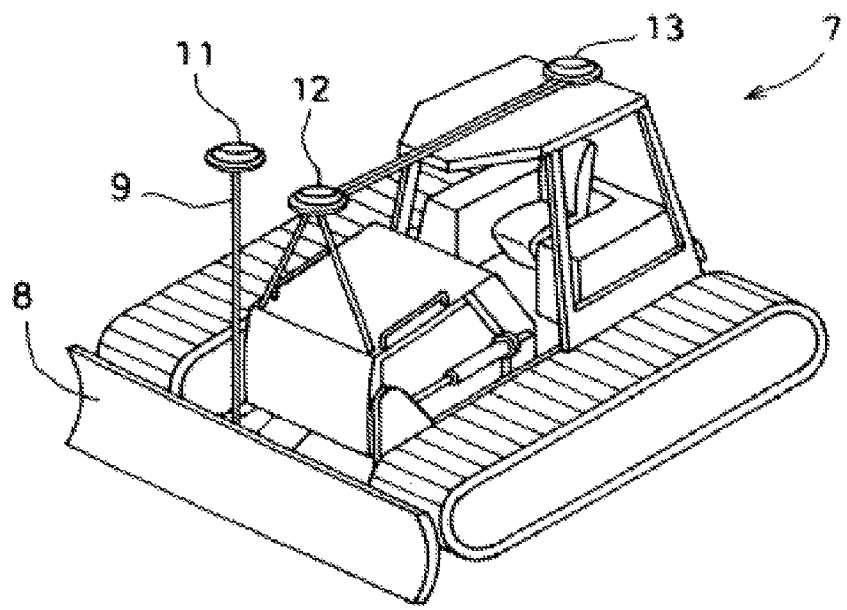
FIG. 7 is a perspective view to show a position detection of a bulldozer blade in another conventional example.

FIG. 5 shows a case where the antenna of the GPS device 32 is installed integrally with the blade-detecting target 21g. The blade-detecting target 21g is disposed within the visual field of each of the cameras 18 and 19.

By the cameras 18 and 19, the stereo-image data of each of the blade-detecting targets 21a, 21b, 21c, 21d, and 21e as well as the stereo-image data of the blade-detecting target 21g of the GPS device 32 are acquired.

By using the GPS device 32, it is possible to determine the position of the blade-detecting target 21 based on the coordinates obtained from a GPS signal received. Coordinates of the blade-detecting targets 21a, 21b, 21c, 21d, and 21e on global geodetic coordinate system can be calculated based on the relation between each of the blade-detecting targets 21a, 21b, 21c, 21d, and 21e as taken in stereo-images and the blade-detecting target 21g, and also, based on a coordinate position of the blade-detecting target 21g. As a result, the position and the posture of the blade 8 can be obtained from the coordinates thus calculated, and the position information based on the position of the blade 8 can be controlled and the construction can be carried out.

Further, the present invention can be applied to a mining industrial machine and to an agricultural machine, for instance, as an industrial machine.

As the agricultural machine, in case where the present invention is applied to a sprinkler, a position and a posture of the sprinkler instrument are detected, in case where the present invention is applied to a leveling instrument, a position and a posture of a blade are detected, and in case where the present invention is applied to a farming machine, a position and a posture of a plow are detected.

The invention claimed is:

1. An industrial machine, comprising an industrial machine main unit, a construction working implement installed on said industrial machine main unit, two cameras each mounted at a known position with respect to a machine center of said industrial machine main unit, at least three targets being installed on said working implement so that the targets are within visual field of each of said two cameras, wherein one of said targets comprises a GPS device, said GPS device adapted to determine a coordinate position, and an arithmetic processing device for extracting images of at least three targets in common to the images from stereo-images taken by said two cameras, for obtaining a three-dimensional position of each target, for calculating a position and a posture of said working implement with respect to the industrial machine main unit based on the three-dimensional position obtained and said coordinate position of said GPS device, and for controlling said working implement based on said position and posture.

2. An industrial machine according to claim 1, wherein said cameras are video-cameras adapted to acquire frame images, and wherein said arithmetic processing device is so designed as to calculate a position and a posture of targets for each frame image acquired by said video-cameras.

3. An industrial machine according to claim 1, wherein each of said targets is a plate or a plate-like object where a reflecting portion in circular shape and a non-reflecting portion around said reflecting portion are formed.

4. An industrial machine according to claim 1, wherein a target image formed by a reflecting portion of each of said targets occupies at least 5 pixels of a photodetector of each camera, and wherein said arithmetic processing device calculates a center of the target image by a moment method.

5. An industrial machine according to claim 1, further comprising a second GPS device being installed on said industrial machine main unit and used for obtaining a position coordinate of said industrial machine main unit, wherein said arithmetic processing device calculates a position coordinate of said working implement based on the position coordinate measured by said second GPS device.

6. An industrial machine according to claim 1, wherein an antenna of said GPS device is integrally mounted with said target.

7. An industrial machine according to claim 1, said industrial machine is a bulldozer or a motor grader and the working implement is a blade.

8. An industrial machine according to claim 1, said industrial machine is a power shovel of a construction machine and the working implement is a bucket.

9. An industrial machine according to claim 1, said industrial machine is a paver of the construction machine and the working implement is a screed.

10. An industrial machine according to claim 1, said industrial machine is a mining industrial machine.

11. An industrial machine according to claim 1, said industrial machine is a sprinkler of an agricultural machine and the working implement is a sprinkler instrument.

12. An industrial machine according to claim 1, said industrial machine is a leveling instrument of an agricultural machine and the working implement is a blade.

13. An industrial machine according to claim 1, said industrial machine is a farming machine of an agricultural machine and the working implement is a plow.

14. A method for controlling the posture and position of a working implement of an industrial machine, said industrial machine comprising an industrial machine main unit and said working implement installed on said industrial machine main unit, said method comprising:
  mounting two cameras each at a known position with respect to a machine center of said industrial machine main unit;
  installing a GPS device on said industrial machine main unit;
  using said GPS device to obtain a coordinate position of said industrial machine main unit;
  installing at least three targets on said working implement so that said targets are within visual field of each of said two cameras;
  extracting images of at least three targets in common to the images from stereo-images taken by said two cameras, using a arithmetic processing unit to obtain a three dimensional position of each target,
  calculating a position and a posture of said working implement with respect to the industrial machine main unit based on the three-dimensional position obtained and based on the coordinate position measured by said GPS device, and
  using said arithmetic processing unit to control said working implement based on said position and posture.

15. A method for controlling the posture and position of a working implement of an industrial machine, said industrial machine comprising an industrial machine main unit and said working implement installed on said industrial machine main unit, said method comprising:

mounting two cameras each at a known position with respect to a machine center of said industrial machine main unit;

installing at least three targets on said working implement so that said targets are within visual field of each of said two cameras;

installing a GPS device on said working implement within visual field of each of said two cameras;

extracting images of at least three targets in common to the images from stereo-images taken by said two cameras, using said GPS device to obtain a coordinate position of said working implement;

using a arithmetic processing unit to obtain a three dimensional position of each target, calculating a position and a posture of said working implement with respect to the industrial machine main unit based on the three-dimensional position obtained and based on the coordinate position measured by said GPS device, and using said arithmetic processing unit to control said working implement based on said position and posture.

* * * * *

UNITED STATES PATENT AND TRADEMARK OFFICE
CERTIFICATE OF CORRECTION

| | | |
|---|---|---|
| PATENT NO. | : 8,412,418 B2 | Page 1 of 1 |
| APPLICATION NO. | : 12/387971 | |
| DATED | : April 2, 2013 | |
| INVENTOR(S) | : Kumagai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this
Eleventh Day of November, 2014

Michelle K. Lee
*Deputy Director of the United States Patent and Trademark Office*